(12) United States Patent
Niewiadomski et al.

(10) Patent No.: US 11,531,331 B2
(45) Date of Patent: Dec. 20, 2022

(54) VEHICLE CONTROL ARBITRATION

(71) Applicant: Ford Global Technologies, LLC, Dearborn, MI (US)

(72) Inventors: Luke Niewiadomski, Dearborn, MI (US); Hamid M. Golgiri, Livonia, MI (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/749,518

(22) Filed: Jan. 22, 2020

(65) Prior Publication Data
US 2021/0223770 A1    Jul. 22, 2021

(51) Int. Cl.
G05D 1/00    (2006.01)
G07C 5/02    (2006.01)
G05D 1/02    (2020.01)

(52) U.S. Cl.
CPC ......... *G05D 1/0016* (2013.01); *G05D 1/0088* (2013.01); *G05D 1/0214* (2013.01); *G07C 5/02* (2013.01); *G05D 2201/0213* (2013.01)

(58) Field of Classification Search
CPC .. G05D 1/0016; G05D 1/0088; G05D 1/0214; G05D 2201/0213; G05D 1/00; G07C 5/02; G07C 5/00; B60K 2370/122; B60K 2370/175; B60K 2370/573; B60K 2370/589; B60K 35/00; B60K 37/04; B60K 2370/40; B60K 2370/58; B60K 37/00; B60R 16/023; B60R 16/00; B60W 50/08

See application file for complete search history.

(56) References Cited

U.S. PATENT DOCUMENTS

| | | |
|---|---|---|
| 9,056,676 B1 * | 6/2015 | Wang .................. B60R 9/00 |
| 9,981,657 B2 | 5/2018 | Joyce et al. |
| 2018/0345954 A1 | 12/2018 | Gougeon et al. |
| 2019/0202444 A1 | 7/2019 | Golgiri et al. |
| 2019/0217855 A1 | 7/2019 | Kim et al. |
| 2022/0138476 A1 * | 5/2022 | Niewiadomski ....... H04N 5/232 382/181 |

FOREIGN PATENT DOCUMENTS

DE    102015016805 A1    7/2016

* cited by examiner

*Primary Examiner* — Yonel Beaulieu
(74) *Attorney, Agent, or Firm* — Frank A. MacKenzie; Bejin Bieneman PLC

(57) ABSTRACT

A system includes a computer including a processor and a memory, the memory storing instructions executable by the processor to actuate a vehicle to execute a maneuver. The instructions include instructions to determine one of that a human operator is in the vehicle or that a human operator is not in the vehicle. The instructions include instructions to select one, and only one, of an in-vehicle human machine interface physically connected to the vehicle or a mobile user device wirelessly connected for providing commands to the vehicle based on whether a human operator is in the vehicle or is not in the vehicle. The instructions include instructions to actuate the vehicle based on commands from, and only based on commands from, the selected one of the in-vehicle human machine interface and the mobile user interface.

20 Claims, 4 Drawing Sheets

VEHICLE CONTROL ARBITRATION

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

A vehicle computer may receive inputs from one or more human machine interfaces (HMIs). The messages typically specify commands from a user to actuate one or more components of the vehicle. For example, the messages may indicate a user is commanding the vehicle to execute a maneuver, e.g., based on the vehicle operating at one of the above levels of automation, increase or decrease a temperature of air in a passenger cabin of the vehicle, lock or unlock vehicle doors and/or windows, etc. However, where more than one HMI device is being or could be used to provide the input to actuate the vehicle, it is a problem to identify the device and/or specific input (or inputs) to be executed.

DETAILED DESCRIPTION

Figure 1:
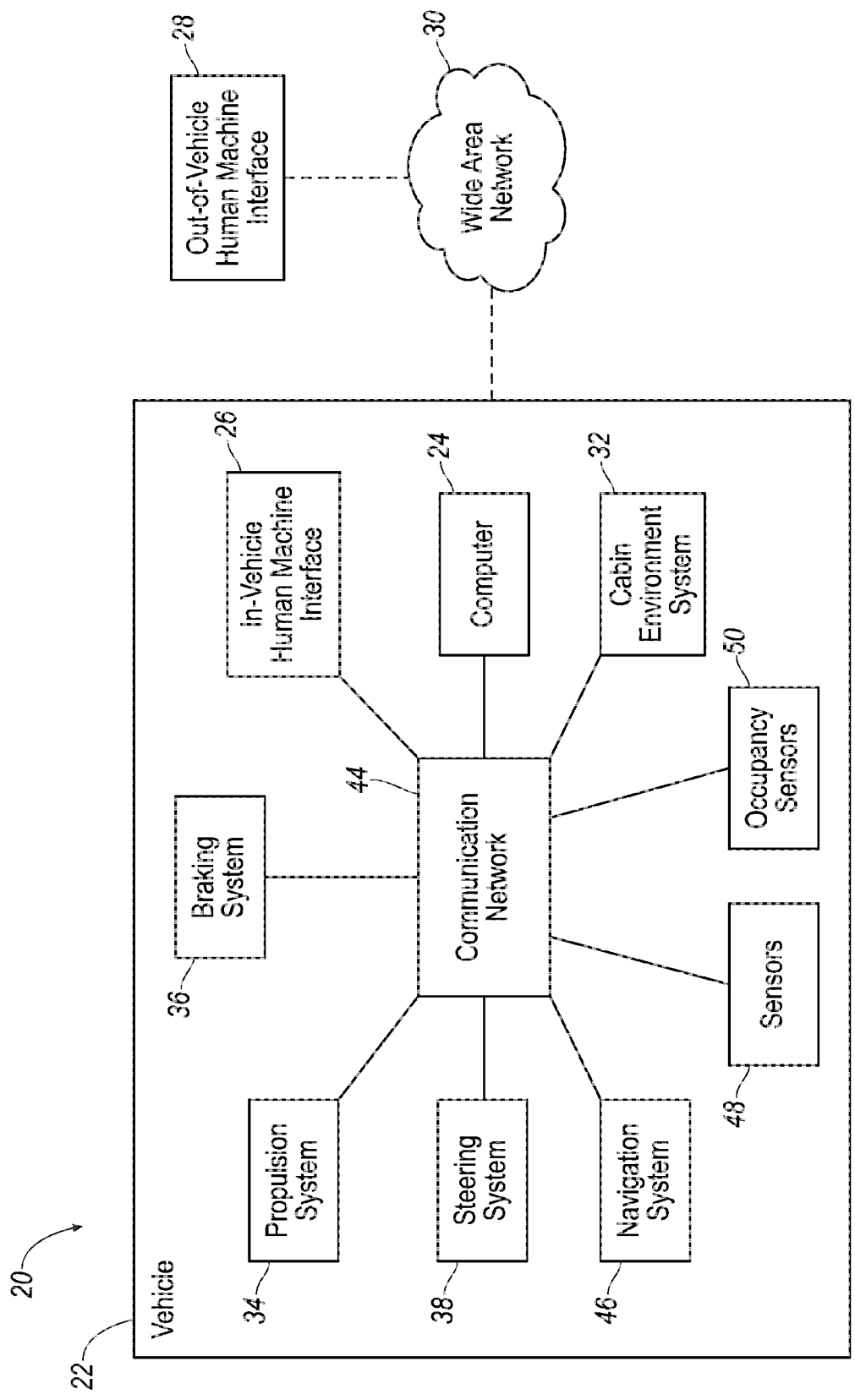
FIG. 1 is a block diagram of components of a system for controlling a vehicle.

A system includes a computer including a processor and a memory, the memory storing instructions executable by the processor to actuate a vehicle to execute a maneuver. The instructions include instructions to determine one of that a human operator is in the vehicle or that a human operator is not in the vehicle. The instructions include instructions to select one, and only one, of an in-vehicle human machine interface physically connected to the vehicle or a mobile user device wirelessly connected for providing commands to the vehicle based on whether a human operator is in the vehicle or is not in the vehicle. The instructions include instructions to actuate the vehicle based on commands from, and only based on commands from, the selected one of the in-vehicle human machine interface and the mobile user interface.

The instructions to actuate the vehicle may include instructions to actuate one or more of a propulsion system, a steering system, or a braking system.

The instructions may include instructions to, upon determining that the human operator is not in the vehicle but that the vehicle is occupied by a passenger, actuate one or more interior control systems based on commands from the in-vehicle human machine interface.

The instructions may include instructions to, upon determining that the human operator is not in the vehicle and that the vehicle is not occupied by a passenger, actuate one or more interior control systems based on a stored environmental parameter.

The instructions may include instructions to, upon determining the vehicle is not occupied by a human operator or a passenger, ignore commands from the in-vehicle human machine interface specifying actuation of one or more interior control systems.

The instructions may include instructions to, upon determining that the human operator is not in the vehicle but that the vehicle is occupied by a passenger, ignore commands from the mobile user device specifying actuation of one or more interior control systems.

The instructions may include instructions to determine when a specified maneuver should not be executed while actuating the vehicle, and upon determining the specified maneuver should not be executed, actuating the selected one of the in-vehicle human machine interface or mobile user device.

The instructions may include instructions to determine when a specified maneuver should not be executed based on a fault that specifies that the maneuver should not be executed.

The fault may specify a malfunction of one of a propulsion system, a braking system, or a steering system of the vehicle.

The instructions may include instructions to determine when the specified maneuver should not be executed based on sensor data specifying an object blocking a path of the vehicle.

The instructions to actuate the vehicle to execute the maneuver may include instructions to operate the vehicle in an autonomous mode.

The instructions to determine one of that the human operator is in the vehicle or that the human operator is not in the vehicle may include instructions to determine one of that a driver seat is occupied or that the driver seat is unoccupied.

The mobile user device may be one of a smart phone, a smart watch, a tablet computer, a personal computer, and a key fob.

A method includes actuating a vehicle to execute a maneuver. The method includes determining one of that a human operator is in the vehicle or that a human operator is not in the vehicle. The method includes selecting one, and only one, of an in-vehicle human machine interface physically connected to the vehicle or a mobile user device wirelessly connected for providing commands to the vehicle based on whether a human operator is in the vehicle or is not in the vehicle. The method includes actuating the vehicle based on commands from, and only based on commands from, the selected one of the in-vehicle human machine interface and the mobile user device.

The method may include, upon determining that the human operator is not in the vehicle but that the vehicle is occupied by a passenger, actuating one or more interior control systems based on commands from the in-vehicle human machine interface and ignoring commands from the mobile user device specifying actuation of one or more interior control systems, and, upon determining that the human operator is not in the vehicle and that the vehicle is not occupied by a passenger, actuating one or more interior control systems based on a stored environmental parameter.

The method may include determining when a specified maneuver should not be executed while actuating the vehicle, and upon determining the specified maneuver should not be executed, actuating the selected one of the in-vehicle human machine interface or mobile user device.

The method may include determining when the specified maneuver should not be executed by receiving data that specifies an object blocking a path of the vehicle or identifying a fault that specifies a malfunction of at least one of a propulsion system, a braking system, or a steering system of the vehicle.

Actuating the vehicle may include actuating one or more of a propulsion system, a steering system, or a braking system.

The method may include, upon determining that the human operator is not in the vehicle but that the vehicle is occupied by a passenger, actuating one or more interior control systems based on commands from the in-vehicle human machine interface.

The method may include, upon determining that the human operator is not in the vehicle and that the vehicle is not occupied by a passenger, actuating one or more interior control systems based on a stored environmental parameter.

The method may include, upon determining the vehicle is not occupied by a human operator or a passenger, ignoring commands from the in-vehicle human machine interface specifying actuation of one or more interior control systems.

The method may include, upon determining that the human operator is not in the vehicle but that the vehicle is occupied by a passenger, ignoring commands from the mobile user device specifying actuation of one or more interior control systems.

The method may include determining when a specified maneuver should not be executed while actuating the vehicle, and upon determining the specified maneuver should not be executed, actuating the selected one of the in-vehicle human machine interface or mobile user device.

The method may include determining when a specified maneuver should not be executed based on a fault that specifies that the maneuver should not be executed.

The fault may specify a malfunction of one of a propulsion system, a braking system, or a steering system of the vehicle.

The method may include determining when the specified maneuver should not be executed based on sensor data specifying an object blocking a path of the vehicle.

The method may include actuating the vehicle to execute the maneuver in an autonomous mode.

The method may include determining that one of that the human operator is in the vehicle or that the human operator is not in the vehicle by determining one of that a driver seat is occupied or that the driver seat is unoccupied.

The mobile user device may be one of a smart phone, a smart watch, a tablet computer, a personal computer, and a key fob.

A computer may include a processor and a memory, the memory storing instructions executable by the processor to perform the method.

A computer-readable medium may store instructions executable by the processor to perform the method.

A system includes means for actuating a vehicle to execute a maneuver. The system includes means for determining one of that a human operator is in the vehicle or that a human operator is not in the vehicle. The system includes means for selecting one, and only one, of an in-vehicle human machine interface physically connected to the vehicle or a mobile user device wirelessly connected for providing commands to the vehicle based on whether a human operator is in the vehicle or is not in the vehicle. The system includes means for actuating the vehicle based on commands from, and only based on commands from, the selected one of the in-vehicle human machine interface and the mobile user device.

The system may include means for determining that the human operator is not in the vehicle but that the vehicle is occupied by a passenger and, upon determining that the human operator is not in the vehicle but that the vehicle is occupied by the passenger, actuating one or more interior control systems based on commands from the in-vehicle human machine interface and ignoring commands from the mobile user device specifying actuation of one or more interior control systems.

The system may include means for determining when a specified maneuver should not be executed actuating the vehicle, and upon determining the specified maneuver should not be executed, actuating the selected one of the in-vehicle human machine interface or mobile user device.

Figure 2:
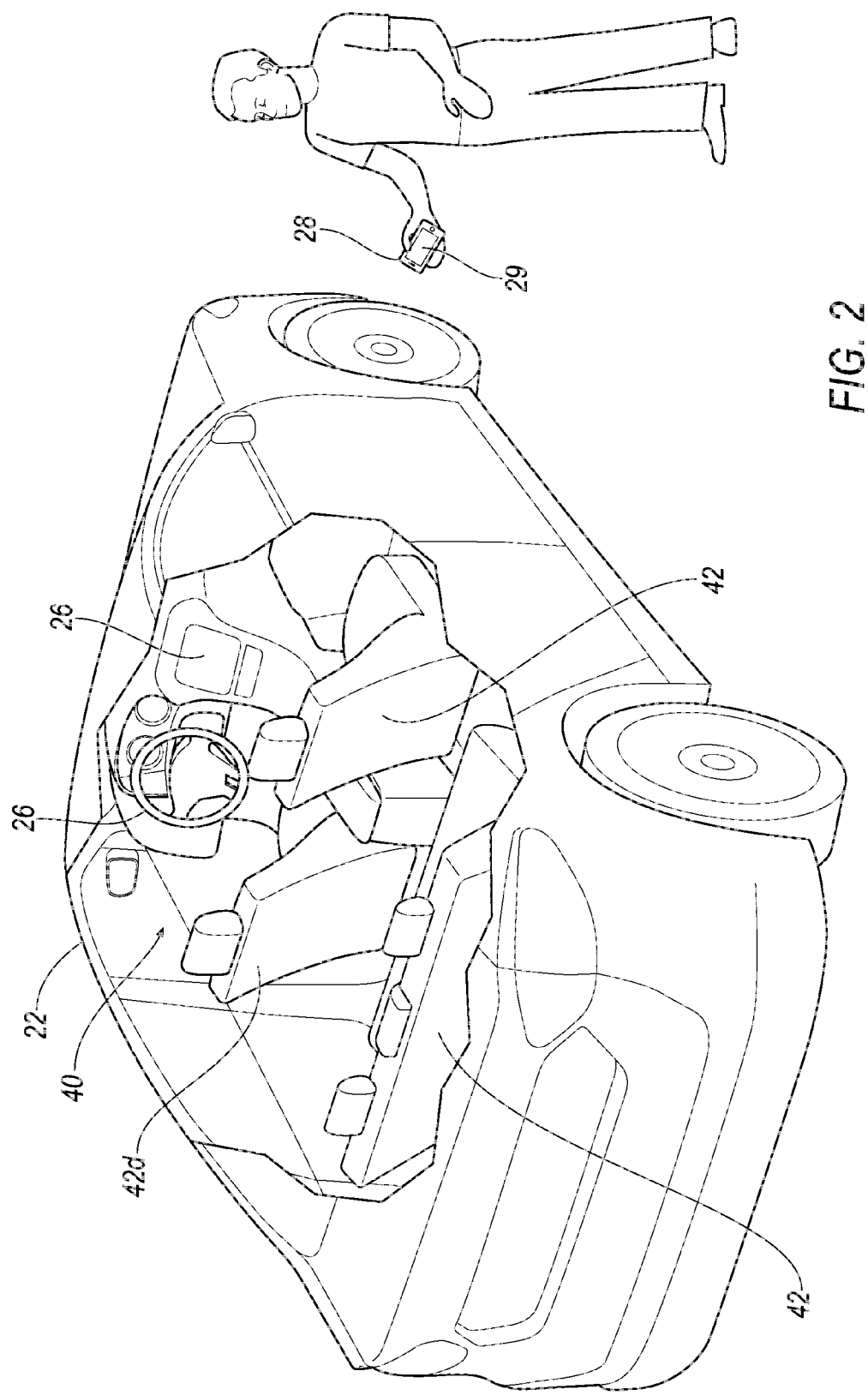
FIG. 2 is a perspective view of the vehicle broken away to illustrate a passenger cabin and a mobile user device.

With reference to FIGS. 1 and 2, wherein like numerals indicate like parts throughout the several views, a system 20 for controlling a vehicle 22 includes a computer 24 including a processor and a memory, the memory storing instructions executable by the processor to actuate the vehicle 22 to execute a maneuver based on detecting a source of an input specifying to execute the maneuver. The instructions include instructions to determine one of that a human operator is in the vehicle 22 or that a human operator is not in the vehicle 22. The instructions include instructions to select one, and only one, of an in-vehicle human machine interface 26, physically connected to the vehicle 22, or a mobile user device 28, wirelessly connected to the vehicle 22, for providing commands to the vehicle 22 based on whether a human operator is in the vehicle 22 or is not in the vehicle 22. The instructions include instructions to actuate the vehicle 22 based on commands from, and only based on commands from, the selected one of the in-vehicle human machine interface 26 and the mobile user device 28.

The systems 20 permits the computer 24 to determine whether to obey commands from the in-vehicle human machine interface 26 or the mobile user device 28 by selecting one of the in-vehicle human machine interface 26 or the mobile user device 28 based on whether a human operator is in the vehicle 22 or is not in the vehicle 22, and thereby remedies the problem that may arise when the computer 24 receives different messages specifying different commands from the in-vehicle human machine interface 26 or the mobile user device 28

The system 20 can include a network 30 to provide communication among components of the system 20, e.g., between the computer 24 of the vehicle 22 and the mobile user device 28. The network 30 (sometimes referred to as the wide area network 30 because it can include communications between devices that are geographically remote from one another, i.e., not in a same building, vehicle 22, etc.) represents one or more mechanisms by which remote devices, e.g., the computer 24 and the mobile user device 28, may communicate with each other. Accordingly, the network 30 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized).

The mobile user device 28 is remote, i.e., separate from, the vehicle 22 and communicates wirelessly with the computer 24 of the vehicle 22. For example, the mobile user device 28 may be configured for using wireless protocols, e.g., Bluetooth®, IEEE 802.11 (colloquially referred to as Wi-Fi®), satellite telecommunication protocols, and cellular protocols such as 3G, LTE, etc., including communication with the computer 24 via the wide area network 30. The mobile user device 28 includes circuits, chips, and an antenna. The mobile user device 28 may include a processor and a memory storing instructions executable by the processor. The mobile user device 28 includes one or more user interfaces, including a human-machine interface (HMI) 29. Conventional exemplary mobile user devices 28 include smart phones, smart watches, tablet computers, personal computers, and key fobs The HMI 29 of the mobile user device 28 can receive an input from a user, and the mobile user device 28 can then transmit a message to the computer 24 based on such input. The message may include a command specifying actuation of the vehicle 22, e.g., to navigate to a specified destination, to heat or cool a passenger cabin 40 of the vehicle 22, etc. The command may specify actuation of a component of the vehicle 22, e.g., actuation of an interior control system 32, a propulsion system 34, a braking system 36, a steering system 38, etc. The message may include an identifier specifying the mobile user device 28, e.g., identifying the mobile user device 28 as transmitting the message. The HMI 29 provides information to the user, e.g., generation of a specified sound or display of a specified image and/or text in response to a command from the computer 24. Example HMIs 29 include buttons, switches, displays (such as an LCD panel), touch screen displays, microphones, speakers, etc.

The vehicle 22 may be any type of passenger or commercial vehicle such as a car, a truck, a sport utility vehicle, a crossover vehicle, a van, a minivan, a taxi, a bus, etc. Although illustrated as a passenger vehicle, the vehicle 22 may be unmanned, e.g., a land-based or aerial drone.

The vehicle 22 may operate in an autonomous mode, a semiautonomous mode, or a nonautonomous mode. For purposes of this disclosure, an autonomous mode is defined as one in which each of the propulsion system 34, the braking system 36, and the steering system 38 are controlled by the computer 24; in a semiautonomous mode the computer 24 controls one or two of the propulsion system 34, the braking system 36, and the steering system 38; in a nonautonomous mode, a human operator controls the propulsion system 34, the braking system 36, and the steering system 38. In some examples, the non-autonomous mode of operation may include SAE levels 0-1, the semiautonomous mode of operation may include SAE levels 2-3, and the autonomous mode of operation may include SAE levels 4-5

The vehicle 22 defines the passenger cabin 40. The passenger cabin 40 may be occupied by one or more passengers, including a human operator of the vehicle 22. One or more seats 42, 42d are supported in the passenger cabin 40, e.g., by a floor of the vehicle 22. One of the seats 42, 42d is a driver seat 42d. The driver seat 42d is positioned to permit a human operator in the driver seat 42d to provide input to in-vehicle human machine interfaces 26 that control the propulsion system 34, the braking system 36, and the steering system 38. For example, an accelerator pedal for providing input to the propulsion system 34, a steering wheel for providing input to the steering system 38, and/or a brake pedal for providing input to the braking system 36 may be directly in front of the driver seat 42d.

One or more in-vehicle human machine interfaces 26 are physically connected, i.e., fixed, to the vehicle 22. For example, the in-vehicle human machine interface 26 may be fixed to an instrument panel in the passenger cabin 40 and configured for communication with the computer 24 via a communication network 44 of the vehicle 22. The in-vehicle human machine interface 26 may include circuits, chips, and an antenna. The in-vehicle human machine interface 26 may include a processor and a memory storing instructions executable by the processor. The in-vehicle human machine interface 26 includes one or more user interfaces. The user interface receives an input from a user, and the in-vehicle human machine interface 26 transmits a message to the computer 24 based on such input. The message may include a command specifying actuation of the vehicle 22, e.g., to navigate to a specified destination, to heat or cool a passenger cabin 40 of the vehicle 22, etc. The command may specify actuation of a component of the vehicle 22, e.g., actuation of the interior control system 32, the propulsion system 34, the steering system 38, the braking system 36, etc. The message may include an identifier specifying the in-vehicle human machine interface 26, e.g., identifying the in-vehicle human machine interface 26 as transmitting the command. The user interface provides information to the user, e.g., generation of a specified sound or display of a specified image and/or text in response to a command from the computer 24. Example user interfaces include buttons, switches, displays (such as an LCD panel), touch screen displays, microphones, speakers, the steering wheel, the brake pedal, the accelerator pedal, etc.

The propulsion system 34 translates energy into motion of the vehicle 22, e.g., in response to a command from the computer 24 and/or in response to an operator input, such as to the accelerator pedal. For example, the propulsion system 34 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 22. In the case of an aerial vehicle, the propulsion system 34 may include one more motors operatively coupled to one or more propellers. The motors provide torque that rotates the propellers, e.g., to generate thrust and control a pitch, roll, and/or yaw of an aerial drone. The propulsion system 34 can be controlled by, and may report data via, an electronic control unit (ECU) or the like in communication with the computer 24.

The braking system 36 resists motion of the vehicle 22 to thereby slow and/or stop the vehicle 22, e.g., in response to an instruction from the computer 24 and/or in response to an operator input, such as to the brake pedal. The braking system 36 may include friction brakes such as disc brakes, drum brakes, band brakes, and so on; regenerative brakes; any other suitable type of brakes; or a combination. The braking system 36 may be controlled by an electronic control unit (ECU) or the like in communication with the computer 24.

The steering system 38 controls the turning of wheels of the vehicle 22. The steering system 38 is in communication with and receives input from a steering wheel and the computer 24. The steering system 38 may be a rack-and-pinion system with electric power-assisted steering, a steer-by-wire system, as are both known in the art, or any other suitable system.

The vehicle 22 may include a navigation system 46. The navigation system 46 is implemented via circuits, chips, or other electronic components that can determine a present location of the vehicle 22. The navigation system 46 may be implemented via satellite-based system such as the Global Positioning System (GPS). The navigation system 46 may triangulate the location of the vehicle 22 based on signals received from various satellites in the Earth's orbit. The navigation system 46 is programmed to output signals representing the present location of the vehicle 22. The navigation system 46 may use data from sensors 48 of the vehicle 22, e.g., wheel speed sensors and a magnetometer, to further determine the location of the vehicle 22. In some instances, the navigation system 46 is programmed to determine a route from the present location to a future location, including developing alternative routes, e.g., when a road is closed or congested. The navigation system 46 may access a map stored in memory of the navigation system 46 and/or the computer 24 and develop the route according to the map.

The vehicle 22 includes sensors 48. The sensors 48 may detect internal states of the vehicle 22, for example, wheel speed, wheel orientation, and engine and transmission variables. The sensors 48 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 48 may detect the external world, for example, radar sensors, scanning laser range finders, light detection and ranging (LIDAR) devices, and image processing sensors such as cameras. LIDAR sensors measure distances to detected objects by illuminating the object with pulsed laser light and measuring return times of reflected pulses. Differences in return times and wavelengths of reflected pulses can then be used to generate data specifying a point cloud. The sensors 48 may include communications devices, for example, vehicle-to-infrastructure (V2I) or vehicle-to-vehicle (V2V) devices.

The vehicle 22 includes one or more occupancy sensors 50. The occupancy sensors 50 are configured to detect a position of occupants of the vehicle 22, e.g., within the passenger cabin 40. For example, the occupancy sensors 50 may be weight sensors supported by the seats 42, 42*d*. As another example, the occupancy sensors 50 may be cameras positioned to capture images of the passenger cabin 40, e.g., supported by the roof, or any other suitable location of the vehicle 22. As yet another example, the occupancy sensors 50 may be sensors (e.g. contact switches, proximity sensor, continuity sensors, etc.) configured to detected when seat belts of the seats 42, 42*d* are either buckled or unbuckled.

The vehicle 22 includes one or more interior control systems 32 that control conditions of the passenger cabin 40. A condition of the passenger cabin 40 describes a sensory experience of a passenger in the passenger cabin 40 that is provided by one or more of the interior control systems 32. In other words, the condition describes a sight, sound, temperature, etc., that is controlled by one or more of the interior control systems 32 and is experienced by a passenger in the passenger cabin 40. The condition may be a specified air temperature, a specified radio station, a specified sound volume, etc. For example, the interior control systems 32 may include a conventional infotainment system that includes speakers that generate sound, e.g., to play broadcast or streaming radio, podcasts, music, etc. As another example, the interior control systems 32 may include a climate control system that increases and/or decreases a temperature of air in the passenger cabin 40. The climate control system may include a conventional heating system and a conventional air conditioning system.

The communication network 44 of the vehicle 22 includes hardware, such as a communication bus, for providing communication among components of the vehicle 22, such as the computer 24, the in-vehicle human machine interface 26, the interior control systems 32, the propulsion system 34, the braking system 36, the steering system 38, the navigation system 46, the sensors 48, and the occupancy sensors 50. The communication network 44 may provide wired and/or wireless communication among the components in accordance with a number of communication protocols such as controller area network (CAN), Ethernet, Wi-Fi, Local Interconnect Network (LIN), and/or other wired or wireless mechanisms.

The computer 24, implemented via circuits, chips, and/or other electronic components, is included in the system for carrying out various operations, including as described herein. The computer 24 is a computing device that generally includes a processor and a memory, the memory including one or more forms of computer-readable media and storing instructions executable by the processor for performing various operations, including as disclosed herein. The memory of the computer 24 further generally stores remote data received via various communications mechanisms; e.g., the computer 24 is generally configured for communications on the communication network 44 or the like, and/or for using other wired or wireless protocols, e.g., Bluetooth, etc. The computer 24 may also have a connection to an onboard diagnostics connector (OBD-II). Via the communication network 44 and/or other wired or wireless mechanisms, the computer 24 may transmit and receive messages to and from various devices in the vehicle 22, e.g., the in-vehicle human machine interface 26, the interior control systems 32, the propulsion system 34, the braking system 36, the steering system 38, the navigation system 46, the sensors 48, the occupancy sensors 50, etc. Although one computer 24 is shown in FIG. 1 for ease of illustration, it is to be understood that the computer 24 could include, and various operations described herein could be carried out by, one or more computing devices.

The computer 24 is programmed to, i.e., the memory of the computer 24 stores instructions executable by the processor of the computer 24 to, determine one of that a human operator is in the vehicle 22 or that a human operator is not in the vehicle 22. The computer 24 determines whether a human operator is or is not in the vehicle 22 based on data from one or more occupancy sensors 50. The computer 24 determines that a human operator is in the vehicle 22 when data from the occupancy sensors 50 specifies that the driver seat 42*d* of the vehicle 22 is occupied. For example, a weight sensor supported by the driver seat 42*d* may specify detection of weight above a threshold. As another example, image data from a camera facing the driver seat 42*d* may be analyzed with image recognition techniques to identify that a human is in the driver seat 42*d*. As yet another example, data from the occupancy sensors 50 may specify that the seat belt for the driver seat 42*d* is buckled. The computer 24 determines that a human operator is not in the vehicle 22 when data from the occupancy sensors 50 specifies that the driver seat 42*d* of the vehicle 22 is not occupied. For example, the weight sensor supported by the driver seat 42d may specify detection of weight below a threshold. As another example, image data from a camera facing the driver seat 42d may be analyzed with image recognition techniques to identify that a human is not in the driver seat 42d. As yet another, data from the occupancy sensors 50 may specify that the seat belt for the driver seat 42d is unbuckled.

The computer 24 is programmed to determine whether the vehicle 22 is occupied by a passenger. A passenger is a human in the vehicle. The passenger may be the human operator. The human operator is a passenger. The computer 24 determines whether the vehicle 22 is occupied by a passenger based on data from one or more occupancy sensors 50. The computer 24 determines that a passenger is in the vehicle 22 when data from the occupancy sensors 50 specifies that at least one seat 42, 42d of the vehicle 22 is occupied. In other words, the computer 24 determines a passenger is in the vehicle 22 when any of the seats 42, 42d are occupied, and determines a human operator is in the vehicle 22 only when the driver seat 42d is occupied. For example, a weight sensor supported by one of the seats 42, 42d may specify detection of weight above a threshold. As another example, image data from a camera facing one or more of the seats 42, 42d may be analyzed with image recognition techniques to identify that a passenger is in one of the seats 42, 42d. As yet another example, data from the occupancy sensors 50 may specify that the seat belt for the any of the seats 42, 42d are buckled. The computer 24 determines that a passenger is not in the vehicle 22 when data from the occupancy sensors 50 specifies that all the seats 42, 42d of the vehicle 22 are not occupied. For example, the weight sensors 48 supported by each of the seats 42, 42d may specify detection of weight below a threshold. As another example, image data from one or more cameras facing the seats 42, 42d may be analyzed with image recognition techniques to identify that no passengers are in the seats 42, 42d. As yet another example, data from the occupancy sensors 50 may specify that the seat belts for all the seats 42, 42d are buckled.

The computer 24 is programmed to execute a maneuver, e.g., to navigate to a specified location, to enter or exit a parking space, to navigate a specified route, etc. The computer 24 actuates the vehicle 22 by actuating one or more of the propulsion system 34, the steering system 38, or the braking system 36, e.g., in the autonomous mode and based on data from the sensors 48 and the navigation system 46. The computer 24 actuates the propulsion system 34, the steering system 38, and/or the braking system 36 by transmitting commands to such systems 34, 36, 38 via the communication network 44. The commands may specify generation of a specified amount of torque by the propulsion system 34, e.g., an amount of fuel to provide an engine, a voltage to provide to a motor, an amount of torque permitted to flow through a clutch, etc. The commands may specific application of a specified amount of resistance to movement of the vehicle 22 by the braking system 36, e.g., an amount of hydraulic pressure provided to brake calipers. The commands may specify a steering angle for the steering system 38 to provide to the wheels. Data from the sensors 48 may specify objects detected by the sensors 48, e.g., with image recognition of data from a camera, point cloud data from a LIDAR sensor, or other conventional techniques. The computer 24 may actuate the propulsion system 34, the steering system 38, and/or the braking system 36 to avoid contact between the vehicle 22 and the objects detected in data from the sensors 48, e.g., using conventional object avoidance and path planning techniques. The navigation system 46 may provide data specifying a route, e.g., a series of roads for the vehicle 22 to follow to reach a destination. The computer 24 may actuate the propulsion system 34, the steering system 38, and/or the braking system 36 to follow the route.

The computer 24 is programmed to actuate the vehicle 22 based on commands received from the in-vehicle human machine interface 26 and from the mobile user device 28. The computer 24 may command one or more components, systems, etc., of the vehicle 22 in response to receiving a command from the in-vehicle human machine interface 26 or the mobile user device 28. For example, the computer 24 may receive a message from the in-vehicle human machine interface 26 or the mobile user device 28 that includes a command specifying navigation of the vehicle 22 to a specified destination in the autonomous mode. In response, the computer 24 may request and receive a route from the navigation system 46 and actuate the propulsion system 34, the steering system 38 and/or the braking system 36 to move the vehicle 22 along the route while performing path planning and object avoidance based on data from the sensors 48. As another example, the computer 24 may receive a command from the in-vehicle human machine interface 26 or the mobile user device 28 specifying actuation of one or more interior control systems 32. In response, the computer 24 may command actuation of the one or more interior control systems 32 as specified in the command. For example, the computer 24 may actuate a heating system to increase a temperature of air in the passenger cabin 40 in response to receiving a command specifying such activation.

The computer 24 is programmed to selectively actuate the vehicle 22 based on whether the command is received from the in-vehicle human machine interface 26 or from the mobile user device 28. In other words, the computer 24 executes commands from a selected in-vehicle human machine interface 26 or mobile user device 28 and ignores, i.e., does not execute, commands from an unselected in-vehicle human machine interface 26 or mobile user device 28.

The computer 24 selects the mobile user device 28 or the in-vehicle human machine interface 26 for providing commands to the vehicle 22 based on the determination of whether a human operator is in the vehicle 22 or is not in the vehicle 22. The computer 24 selects the in-vehicle human machine interface 26 (and does not select the mobile user device 28) in response to determining a human operator is in the vehicle 22. The computer 24 selects the mobile user device 28 (and does not select the in-vehicle human machine interface 26) in response to determining a human operator is not in the vehicle 22. The computer 24 stores the selected mobile user device 28 or in-vehicle human machine interface 26 in memory.

The computer 24 may select the mobile user device 28 or the in-vehicle human machine interface 26 to provide commands specifying actuation of one or more of the interior control systems 32 based on the determination of whether a passenger is in the vehicle 22 or is not in the vehicle 22. The computer 24 selects the in-vehicle human machine interface 26 (and does not select the mobile user device 28) in response to determining a passenger is in the vehicle 22. The computer 24 selects the mobile user device 28 (and does not select the in-vehicle human machine interface 26) in response to determining a passenger is not in the vehicle 22. The computer 24 stores the selected mobile user device 28 or in-vehicle human machine interface 26 in memory.

The computer 24 is programmed to determine whether a command is received from the in-vehicle human machine interface 26 or the mobile user device 28. The computer 24 may determine whether a command is received from the in-vehicle human machine interface 26 or the mobile user device 28 based on an identifier in a message that includes the command. The computer 24 determines a command is from the in-vehicle human machine interface 26 when a message including such command also includes an identifier specifying the in-vehicle human machine interface 26. The computer 24 determines a command is from the mobile user device 28 when a message including such command also includes an identifier specifying the mobile user device 28. The computer 24 may determine whether a command is received from the in-vehicle human machine interface 26 or the mobile user device 28 based whether such command is received via the communication network 44 or via the wide area network 30. The computer 24 determines a command is from the in-vehicle human machine interface 26 when such command is received via the communication network 44. The computer 24 determines a command is from the mobile user device 28 when such command is received via the wide area network 30.

The computer 24 compares the selected in-vehicle human machine interface 26 or mobile user device 28 for providing commands with the determination of whether a command is received from the in-vehicle human machine interface 26 or mobile user device 28 to determine whether a match exists. The computer 24 determines the match exists when the selected in-vehicle human machine interface 26 or mobile user device 28 for providing commands is the same as the in-vehicle human machine interface 26 or mobile user device 28 from which the command was received. In other words, the computer determines the match exists when the in-vehicle human machine interface 26 is selected for providing commands and the command was received from the in-vehicle human machine interface 26, or when the mobile user device 28 is selected for providing commands and the command was received from the mobile user device 28. The computer 24 determines no match exists when the in-vehicle human machine interface 26 is selected for providing commands and the command was received from the mobile user device 28, or vice versa.

The computer 24 executes the command upon determining the selected in-vehicle human machine interface 26 or mobile user device 28 for providing commands matches the determination of whether the command is received from the in-vehicle human machine interface 26 or mobile user device 28. The computer 24 ignores the command upon determining the selected in-vehicle human machine interface 26 or mobile user device 28 for providing commands does not match the determination of whether the command is received from the in-vehicle human machine interface 26 or mobile user device 28.

The computer 24 may be programmed to actuate one or more of the interior control systems 32 based on an environmental parameter stored in memory of the computer 24. The environmental parameter specifies one or more conditions for the passenger cabin 40, e.g., a specified air temperature for a climate control system, a specified radio station and/or volume for an infotainment system, etc. The environmental parameter may be stored when the vehicle 22 is manufactured, input by an operator of the vehicle 22 via one of the in-vehicle human machine interface 26 or the mobile user device 28, etc. The computer 24 may actuate one or more of the interior control systems 32 based on the environmental parameter in response to determining there are no passengers in the vehicle 22.

The computer 24 is programmed to determine when a specified maneuver should not be executed. The computer 24 may determine the specified maneuver should not be executed upon detecting one or more faults. A fault is a status specifying that one or more components, systems, etc., of the vehicle 22 are in a condition so as to be non-operational or operating in a manner not meeting specified parameters for operation, e.g., as indicated by a fault code provided via a CAN bus. The fault may indicate that a condition of one or more components, systems, etc., of the vehicle 22 is not optimal for completing the specified maneuver. For example, the fault may indicate a malfunction of the propulsion system 34, the braking system 36, or the steering system 38 of the vehicle 22. The malfunction may inhibit or restrict the propulsion system 34 from generating a specified amount of torque. The malfunction may inhibit or restrict the braking system 36 from generating a specified amount of resistance to movement. The malfunction may inhibit or restrict the steering system 38 from moving the wheels to a specified steering angle.

The computer 24 may determine the specified maneuver should not be executed when data from the sensors 48 specifies that operation of the vehicle 22 by the computer 24 in the autonomous mode to perform the maneuver is inhibited or restricted by an object outside the vehicle. For example, the data from the sensors 48 may indicate an object blocking a path of the vehicle 22 and inhibiting the vehicle 22 from navigating to a specified destination. The object may be detected by the sensors 48, e.g., based on data from a camera, a sonar, a LIDAR, etc., using techniques such as image recognition, stereo image analysis, time of flight analysis, and other conventional techniques.

The computer 24 is programmed to actuate the in-vehicle human machine interface 26 and the HMI 29 of the mobile user device 28. The computer 24 actuates the in-vehicle human machine interface 26 by transmitting one or more commands to the in-vehicle human machine interface 26, e.g., via communication network 44. The computer 24 actuates the HMI 29 of the mobile user device 28 by transmitting one or more commands to the mobile user device 28, e.g., via the wide area network 30. The commands may specify actuation of the in-vehicle human machine interface 26 or HMI 29 of the mobile user device 28 to provide information, e.g., to display a fault, to prompt an input from a human, etc.

The computer 24 is programmed to selectively actuate the in-vehicle human machine interface 26 and the mobile user device 28. In other words, the computer 24 may transmit commands to the selected in-vehicle human machine interface 26 or mobile user device 28 and not transmit commands to the unselected in-vehicle human machine interface 26 or mobile user device 28.

Figure 3A:
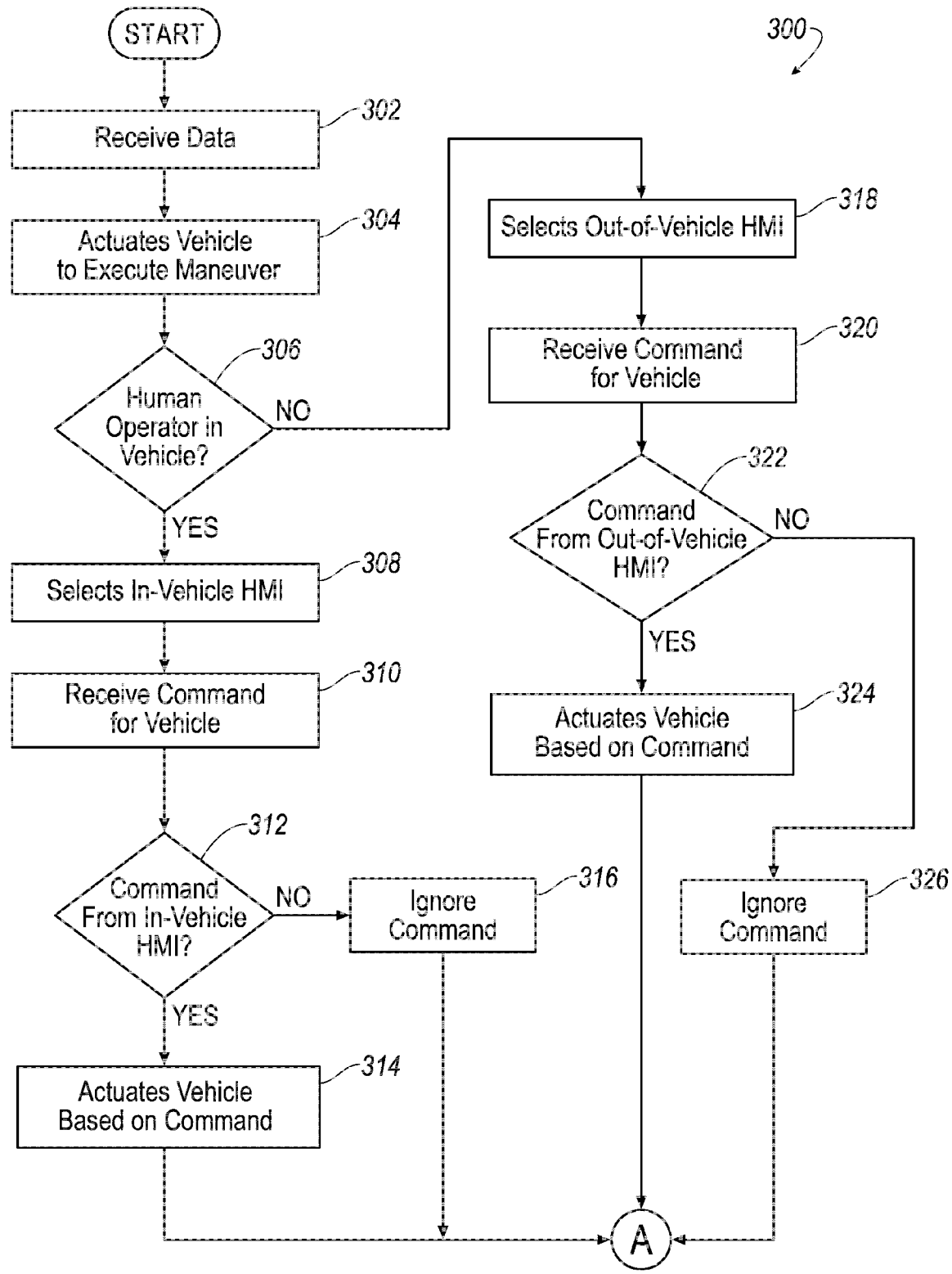
FIG. 3A is a flowchart for controlling the vehicle with the system.
Figure 3B:
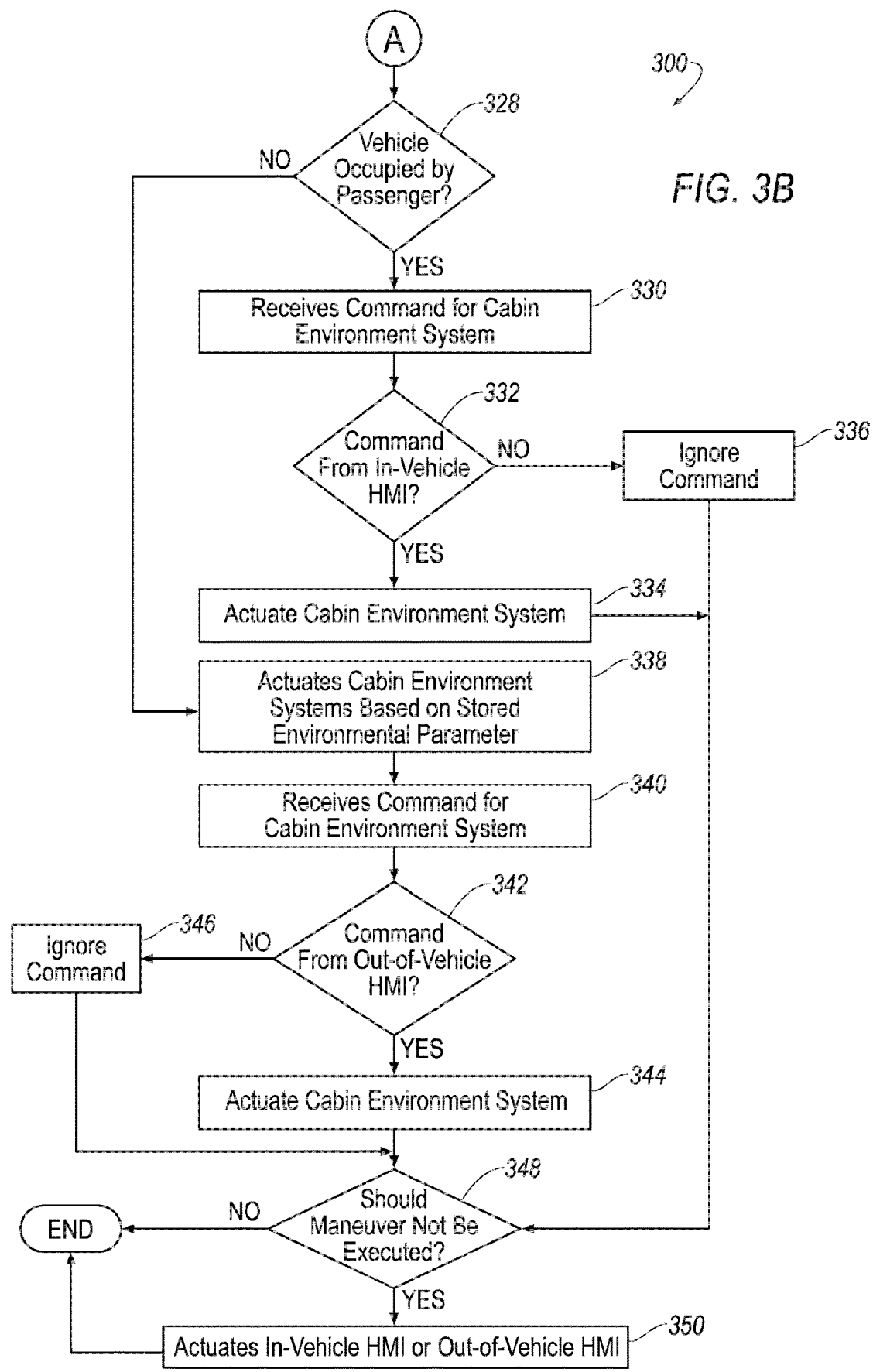
FIG. 3B is a continuation of the flow chart of FIG. 3A.

FIGS. 3A and B show a process flow diagram illustrating an exemplary process 300 for operating the system 20. The process 300 begins in a block 302 in which the computer 24 receives data, e.g., from the sensors 48, the occupancy sensors 50, and the navigation system 46 via the communication network 44. The computer 24 may receive data substantially continuously or at intervals, e.g., every 100 milliseconds.

At a block 304 the computer 24 actuates the vehicle 22 to execute a maneuver, e.g., to navigate to a specified location such as a parking space. The computer 24 actuates the vehicle 22 by actuating one or more of the propulsion system 34, the steering system 38, or the braking system 36, e.g., based on data from the sensors 48 and the navigation system 46. For example, the computer 24 may actuate the vehicle 22 to execute the maneuver by operating the vehicle 22 in the autonomous mode.

At a block 306 the computer 24 determines one of that a human operator is in the vehicle 22 or that a human operator is not in the vehicle 22, e.g., based on data from one or more occupancy sensors 50. Upon determining that a human operator is in the vehicle 22 the process 300 moves to a block 308. Upon determining that a human operator is not in the vehicle 22 the process 300 moves to a block 318.

At the block 308 the computer 24 selects the in-vehicle human machine interface 26 for providing commands and does not select the mobile user device 28. The computer 24 stores the selection in memory.

Next, at a block 310 the computer 24 receives a command from either the in-vehicle human machine interface 26, e.g., via the communication network 44, or the mobile user device 28, e.g., via the wide area network 30.

At a block 312 the computer 24 determines whether the command received at the block 310 is from the in-vehicle human machine interface 26 selected at the block 308, e.g., based on data specifying the in-vehicle human machine interface 26 included with the command, based on receiving the command via the communication network 44, etc. Upon determining the command is from the in-vehicle human machine interface 26 the process 300 moves to a block 314. Upon determining the command is not from the in-vehicle human machine interface 26, i.e., the command is from the mobile user device 28, the process 300 moves to a block 316.

At the block 314 the computer 24 actuates the vehicle 22 based on the command received at the block 310. For example, the computer 24 may transmit commands to the propulsion system 34, the braking system 36, and/or steering system 38 via the communication network 44 and as specified in the command.

At the block 316 the computer 24 ignores, i.e., does not execute, the command received at the block 310.

At the block 318 the computer 24 selects the mobile user device 28 for providing commands and does not select the in-vehicle human machine interface 26. The computer 24 stores the selection in memory.

Next, at a block 320 the computer 24 receives a command from either the in-vehicle human machine interface 26, e.g., via the communication network 44, or the mobile user device 28, e.g., via the wide area network 30.

Next, at a block 322 the computer 24 determines whether the command received at the block 320 is from the mobile user device 28 selected at the block 18, e.g., based on data specifying the mobile user device 28 included with the command, based on receiving the command via the wide area network 30, etc. Upon determining the command is from the mobile user device 28 the process 300 moves to a block 324. Upon determining the command is not from the mobile user device 28, i.e., the command is from the mobile user device 28, the process 300 moves to a block 326.

At the block 324 the computer 24 actuates the vehicle 22 based on command received at the block 320. For example, the computer 24 may transmit commands to the propulsion system 34, the braking system 36, and/or steering system 38 via the communication network 44 and as specified in the command.

At the block 326 the computer 24 ignores the command received at the block 320.

At a block 328 the computer 24 determines whether the vehicle 22 is occupied by a passenger, e.g., based on data from one or more of the occupancy sensors 50. Upon determining the vehicle 22 is occupied by a passenger the process 300 moves to a block 330. Upon determining the vehicle 22 is not occupied by a passenger the process 300 moves to a block 338.

At the block 330 the computer 24 receives a command specifying actuation of one or more interior control systems 32 from either the in-vehicle human machine interface 26, e.g., via the communication network 44, or the mobile user device 28, e.g., via the wide area network 30.

Next, at a block 332 the computer 24 determines whether the command received at the block 330 is from the in-vehicle human machine interface 26, e.g., based on data specifying the in-vehicle human machine interface 26 included with the command, based on receiving the command via the communication network 44, etc. Upon determining the command is from the in-vehicle human machine interface 26 the process 300 moves to a block 334. Upon determining the command is not from the in-vehicle human machine interface 26, i.e., the command is from the mobile user device 28, the process 300 moves to a block 336.

At the block 334 the computer 24 actuates one or more interior control systems 32 based on the command from the in-vehicle human machine interface 26 received at the block 330. For example, the computer 24 may transmit commands to one or more interior control systems 32 via the communication network 44 and specifying actuation of the one or more interior control systems 32 as specified in the command from the in-vehicle human machine interface 26.

At the block 336 the computer 24 ignores the command from the mobile user device 28 received at the block 330.

At the block 338 the computer 24 actuates one or more interior control systems 32 based on a stored environmental parameter. For example, the computer 24 may transmit commands to one or more interior control systems 32 via the communication network 44 and specifying actuation of the one or more interior control systems 32 as specified in the stored environmental parameter.

At a block 340 the computer 24 receives a command specifying actuation of one or more interior control systems 32 from either the in-vehicle human machine interface 26, e.g., via the communication network 44, or the mobile user device 28, e.g., via the wide area network 30.

At a block 342 the computer 24 determines whether the command received at the block 340 is from the mobile user device 28, e.g., based on data specifying the mobile user device 28 included with the command, based on receiving the command via the wide area network 30, etc. Upon determining the command is from the mobile user device 28 the process 300 moves to a block 344. Upon determining the command is not from the mobile user device 28, i.e., the command is from the in-vehicle human machine interface 26, the process 300 moves to a block 346.

At the block 344 the computer 24 actuates one or more interior control systems 32 based on the command from the mobile user device 28 received at the block 340. For example, the computer 24 may transmit commands to one or more interior control systems 32 via the communication network 44 and s specifying actuation of the one or more interior control systems 32 as specified in the command from the mobile user device 28.

At the block 346 the computer 24 ignores commands from the in-vehicle human machine interface 26 received at the block 340.

At a block 348 the computer 24 determines whether a specified maneuver should not be executed. For example, the computer 24 may analyze data from sensors 48 to identify whether an object is blocking a path of the vehicle 22. As another example, the computer 24 may determine whether a fault indicating a malfunction of the propulsion system 34, the braking system 36, or the steering system 38 of the vehicle 22 has been received. Upon determining a specified maneuver should not be executed the process 300 moves to a block 350. Upon not determining a specified maneuver should not be executed the process 300 may end, or alternately, return to the block 302.

At the block 350 the computer 24 actuates one of the in-vehicle human machine interface 26 or HMI 29 of the mobile user device 28 to display an indication of why the maneuver should not be executed, e.g., based on which of the in-vehicle human machine interface 26 or mobile user device 28 was selected at the block 308 or 316. For example, the computer 24 may transmit a command specifying actuation of a screen to display a fault, an indication of an object blocking a path of the vehicle, etc. After the block 350 the process 300 may end, or alternately, return to the block 302.

With regard to the process 300 described herein, it should be understood that, although the steps of such process 300 have been described as occurring according to a certain ordered sequence, such process 300 could be practiced with the described steps performed in an order other than the order described herein. It further should be understood that certain steps could be performed simultaneously, that other steps could be added, or that certain steps described herein could be omitted. In other words, the description of the process 300 herein is provided for the purpose of illustrating certain embodiments and should in no way be construed so as to limit the disclosed subject matter.

Computing devices, such as the computer 24 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and a memory, the memory storing instructions executable by the processor to:
   actuate a vehicle to execute a maneuver;
   determine one of that a human operator is in the vehicle or that a human operator is not in the vehicle;
   select one, and only one, of an in-vehicle human machine interface physically connected to the vehicle or a mobile user device wirelessly connected for providing commands to the vehicle based on whether a human operator is in the vehicle or is not in the vehicle; and
   actuate the vehicle based on commands from, and only based on commands from, the selected one of the in-vehicle human machine interface and the mobile user interface.

2. The system of claim 1, wherein the instructions to actuate the vehicle include instructions to actuate one or more of a propulsion system, a steering system, or a braking system.

3. The system of claim 1, wherein the instructions include instructions to, upon determining that the human operator is not in the vehicle but that the vehicle is occupied by a passenger, actuate one or more interior control systems based on commands from the in-vehicle human machine interface.

4. The system of claim 1, wherein the instructions include instructions to, upon determining that the human operator is not in the vehicle and that the vehicle is not occupied by a passenger, actuate one or more interior control systems based on a stored environmental parameter.

5. The system of claim 1, wherein the instructions include instructions to, upon determining the vehicle is not occupied by a human operator or a passenger, ignore commands from the in-vehicle human machine interface specifying actuation of one or more interior control systems.

6. The system of claim 1, wherein the instructions include instructions to, upon determining that the human operator is not in the vehicle but that the vehicle is occupied by a passenger, ignore commands from the mobile user device specifying actuation of one or more interior control systems.

7. The system of claim 1, wherein the instructions include instructions to determine when a specified maneuver should not be executed while actuating the vehicle, and upon determining the specified maneuver should not be executed, actuating the selected one of the in-vehicle human machine interface or mobile user device.

8. The system of claim 7, wherein the instructions include instructions to determine when a specified maneuver should not be executed based on a fault that specifies that the maneuver should not be executed.

9. The system of claim 8, wherein the fault specifies a malfunction of one of a propulsion system, a braking system, or a steering system of the vehicle.

10. The system of claim 7, wherein the instructions include instructions to determine when a specified maneuver should not be executed based on sensor data specifying an object blocking a path of the vehicle.

11. The system of claim 1, wherein the instructions to actuate the vehicle to execute the maneuver include instructions to operate the vehicle in an autonomous mode.

12. The system of claim 1, wherein the instructions to determine one of that the human operator is in the vehicle or that the human operator is not in the vehicle include instructions to determine one of that a driver seat occupied or that the driver seat is unoccupied.

13. The system of claim 1, wherein the mobile user device is one of a smart phone, a tablet computer, a smart watch, a personal computer, and a key fob.

14. A method, comprising:
actuating a vehicle to execute a maneuver;
determining one of that a human operator is in the vehicle or that a human operator is not in the vehicle;
selecting one, and only one, of an in-vehicle human machine interface physically connected to the vehicle or a mobile user device wirelessly connected for providing commands to the vehicle based on whether a human operator is in the vehicle or is not in the vehicle; and
actuating the vehicle based on commands from, and only based on commands from, the selected one of the in-vehicle human machine interface and the mobile user device.

15. The method of claim 14, further comprising, upon determining that the human operator is not in the vehicle but that the vehicle is occupied by a passenger, actuating one or more interior control systems based on commands from the in-vehicle human machine interface and ignoring commands from the mobile user device specifying actuation of one or more interior control systems, and, upon determining that the human operator is not in the vehicle and that the vehicle is not occupied by a passenger, actuating one or more interior control systems based on a stored environmental parameter.

16. The method of claim 14, further comprising determining when a specified maneuver should not be executed while actuating the vehicle, and upon determining the specified maneuver should not be executed, actuating the selected one of the in-vehicle human machine interface or mobile user device.

17. The method of claim 16, wherein determining when the specified maneuver should not be executed includes receiving data that specifies an object blocking a path of the vehicle or identifying a fault that specifies a malfunction of at least one of a propulsion system, a braking system, or a steering system of the vehicle.

18. A system, comprising:
means for actuating a vehicle to execute a maneuver;
means for determining one of that a human operator is in the vehicle or that a human operator is not in the vehicle;
means for selecting one, and only one, of an in-vehicle human machine interface physically connected to the vehicle or a mobile user device wirelessly connected for providing commands to the vehicle based on whether a human operator is in the vehicle or is not in the vehicle; and
means for actuating the vehicle based on commands from, and only based on commands from, the selected one of the in-vehicle human machine interface and the mobile user device.

19. The system of claim 18, further comprising means for determining that the human operator is not in the vehicle but that the vehicle is occupied by a passenger and, upon determining that the human operator is not in the vehicle but that the vehicle is occupied by the passenger, actuating one or more interior control systems based on commands from the in-vehicle human machine interface and ignoring commands from the mobile user device specifying actuation of one or more interior control systems.

20. The system of claim 18, further comprising means for determining when a specified maneuver should not be executed actuating the vehicle, and upon determining the specified maneuver should not be executed, actuating the selected one of the in-vehicle human machine interface or mobile user device.

* * * * *